United States Patent
Leobandung

(10) Patent No.: US 10,291,414 B1
(45) Date of Patent: May 14, 2019

(54) SRAM AS PHYSICALLY UNCLONABLE FUNCTION

(71) Applicant: International Business Machines Corporation, Armonk, NY (US)

(72) Inventor: Effendi Leobandung, Stormville, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/837,062

(22) Filed: Dec. 11, 2017

(51) Int. Cl.
  *H04L 9/32* (2006.01)
  *H04L 29/06* (2006.01)
  *G06F 21/72* (2013.01)
  *H04L 9/08* (2006.01)
  *G06F 11/07* (2006.01)

(52) U.S. Cl.
  CPC .......... *H04L 9/3278* (2013.01); *G06F 21/72* (2013.01); *H04L 9/0866* (2013.01); *H04L 63/0876* (2013.01); *G06F 11/0745* (2013.01)

(58) Field of Classification Search
  None
  See application file for complete search history.

(56) References Cited

U.S. PATENT DOCUMENTS

| | | | |
|---|---|---|---|
| 6,707,718 B1* | 3/2004 | Halim | G11C 29/16 365/185.18 |
| 9,324,436 B2* | 4/2016 | Kim | G11C 16/10 |
| 9,448,874 B2 | 9/2016 | Kim et al. | |
| 2014/0325237 A1 | 10/2014 | Van Der Leest et al. | |
| 2015/0163211 A1 | 6/2015 | Chellappa et al. | |
| 2016/0093393 A1* | 3/2016 | Park | G11C 16/26 380/28 |

OTHER PUBLICATIONS

"List of IBM Patents or Patent Applications Treated as Related," Letter from Leslie A. Van Leeuwen, Dec. 11, 2017, 1 page.
Leobandung, "SRAM as Random Number Generator," U.S. Appl. No. 15/837,071, filed Dec. 11, 2017, 43 pages.

* cited by examiner

*Primary Examiner* — Minh D A
*Assistant Examiner* — James H Cho
(74) *Attorney, Agent, or Firm* — VanLeeuwen & VanLeeuwen; Jeffrey S. LaBaw

(57) ABSTRACT

An approach is provided in which an information handling system performs multiple tests on a memory device using different supply voltage levels. The information handling system identifies a set of memory cells in the memory that produce a same result during each of the memory tests at the different supply voltage levels, and generates a unique identifier based on the set of memory cells. In turn, the information handling system uses the unique identifier in one or more processes executed by the information handling system.

19 Claims, 10 Drawing Sheets

SRAM AS PHYSICALLY UNCLONABLE FUNCTION

BACKGROUND

A physically unclonable function (PUF) is a physical entity that is embodied in a physical structure. PUFs are typically used to generate a PUF value that uniquely authenticates a system or application having high security requirements. Some types of electronic devices are suitable as PUFs because their manufacturing process instills random intrinsic characteristics into the electronic device and causes the electronic devices to generate device-unique startup state values.

BRIEF SUMMARY

According to one embodiment of the present disclosure, an approach is provided in which an information handling system performs multiple tests on a memory device using different supply voltage levels. The information handling system identifies a set of memory cells in the memory that produce a same result during each of the memory tests at the different supply voltage levels, and generates a unique identifier based on the set of memory cells. In turn, the information handling system uses the unique identifier in one or more processes executed by the information handling system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
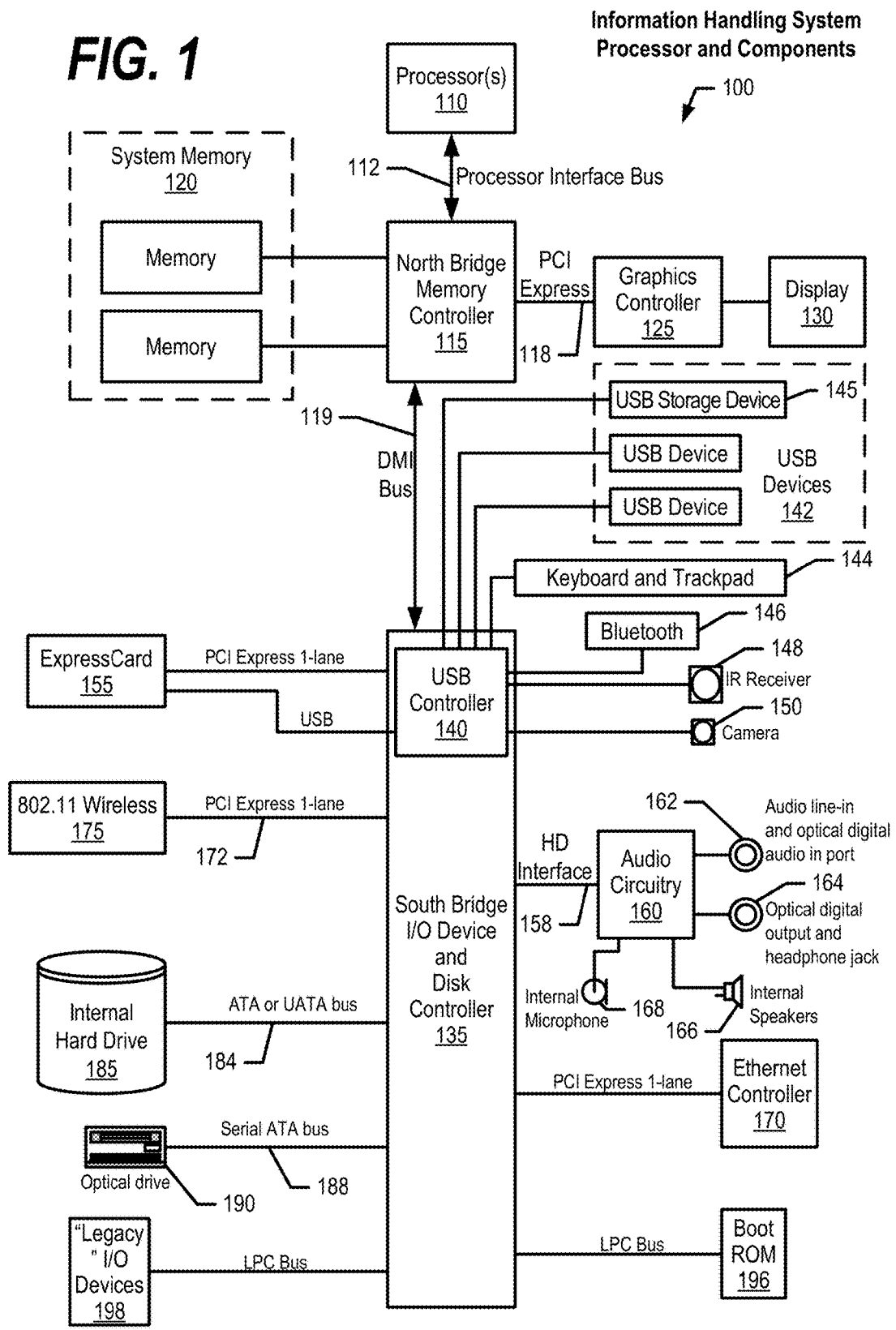
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
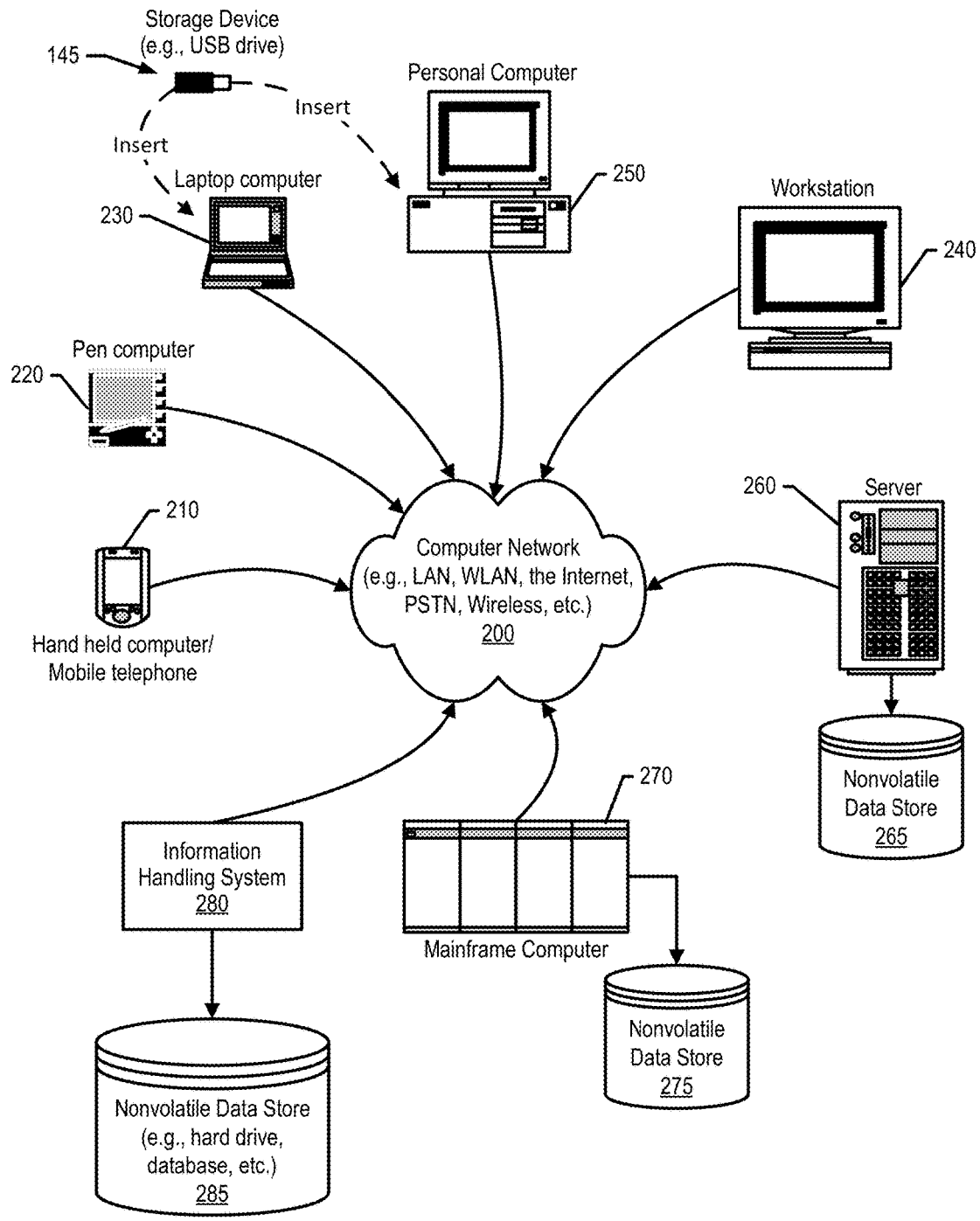
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, imperfections in an electronic device manufacturing process instill random intrinsic characteristics into the electronic device. For memory devices, such as Static Random Access Memories (SRAM), the random intrinsic characteristics cause imbalances between Vdd and ground in each memory cell that result in each memory cell leaning to either a 0 or 1 as a startup state. These device-unique start up state values have been used in the past to generate PUF values. A challenge found, however, is that some memory cells are fairly balanced between Vdd and ground and, therefore, are not consistent in their startup state. In turn, the balanced memory cells create inconsistent PUF values, which is unacceptable.

Another random intrinsic characteristic of a memory device manufacturing process is that each memory cell has a slightly different minimum operating voltage (Vmin). The memory device is specified to operate at a device level Vmin for which all memory cells must operate, but each cell within the memory device may still operate at different voltage levels below the device level Vmin. As such, each die from a wafer has a unique Vmin footprint.

FIGS. 3 through 8 describe an approach that may be implemented on an information handling system that creates a cell map of functioning cells at different operating voltages and uses the cell map to create a PUF value. The information handling system performs a series of multi-voltage memory tests and identifies passing memory cells, randomly failing memory cells, and failing memory cells. From the device-unique cell map, the information handling system generates a device-unique PUF value that the information handling system uses for authentication.

In one embodiment, the information handling system first identifies memory cells that pass each memory test at each supply voltage level. Then, the information handling system identifies the address locations of the passing memory cells and uses the address locations to generate the PUF value, such as through a hashing algorithm.

In another embodiment, the information handling system uses the cell map to generate a random number. In this embodiment, the information handling system identifies memory cells that pass the memory test at some supply voltages, but fail the memory test at other supply voltages, referred to as randomly failing cells. These memory cells have a Vmin close to the supply voltages because as evidenced by their test results. As such, as described above, when a memory cell is operating below its Vmin, the memory cell produces inconsistent, random results. Therefore, the information handling system captures the state values of the randomly failing cells and uses this data as the random number.

Figure 3:
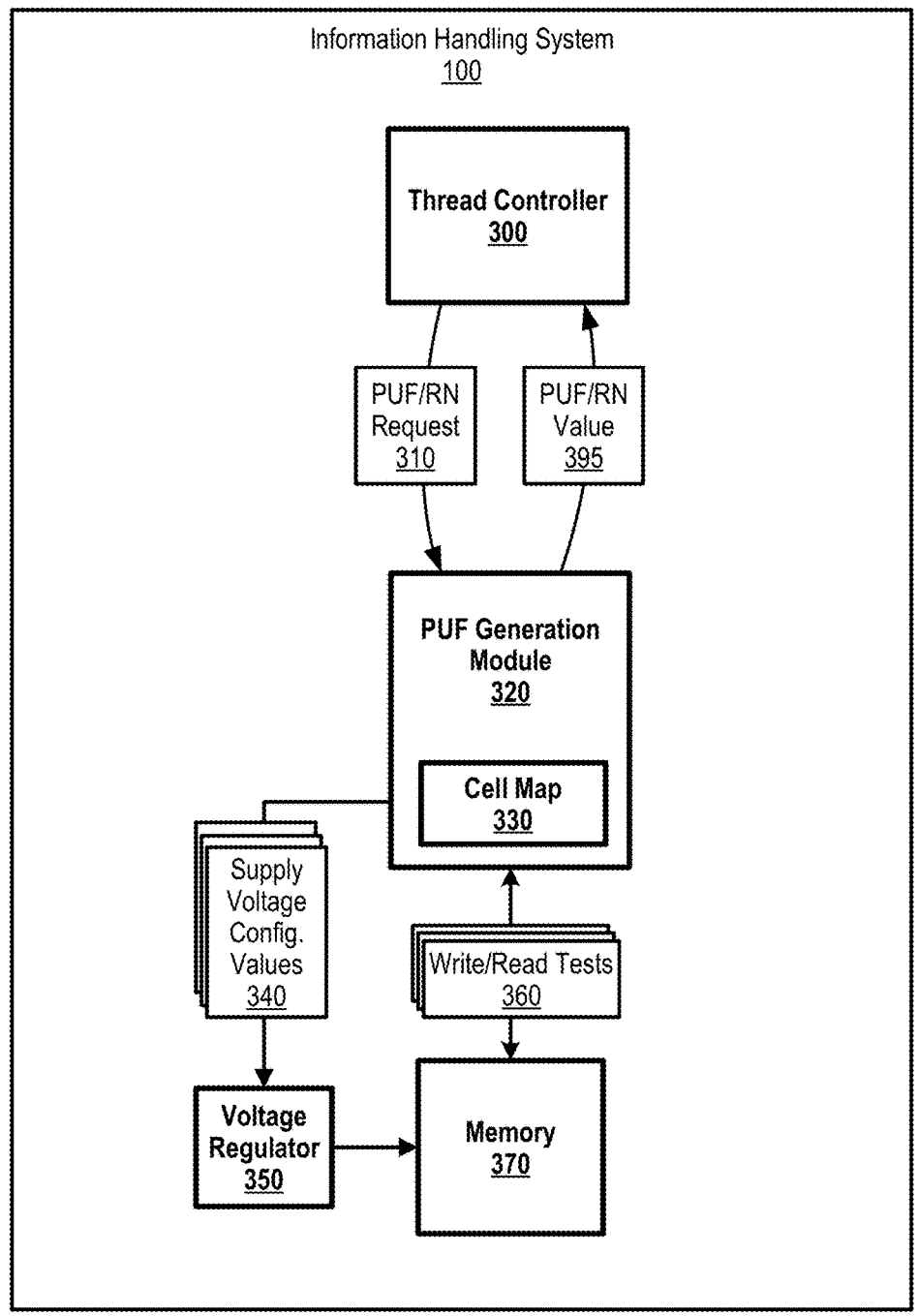
FIG. 3 is an exemplary diagram depicting a system generating a physically unclonable function (PUF) value in real-time by performing multi-voltage cell tests on a memory.

FIG. 3 is an exemplary diagram depicting a system generating a physically unclonable function (PUF) value or random number (RN) in real-time based on identifying cells within a memory that produce consistent results from multi-voltage cell tests on the memory. Information handling system 100 includes thread controller 300, which controls processing threads executing on information handling system 100. At times, thread controller 300 may be executing a thread that requires a physically unclonable function value, such as when an application requires information handling system 100 to be authenticated. As such, thread controller 300 sends PUF/RN request 310 to PUF generation module 320.

PUF generation module 320 sets memory 370's supply voltage to a certain level below its nominal voltage level by sending supply voltage configuration value 340 to voltage regulator 350. Voltage regulator 350, in turn, provides the specified supply voltage to memory 370 that, in one embodiment, is supplied solely to memory 370 and not the rest of information handling system 100. In one embodiment, PUF generation module 320 performs a series of tests on memory 370 to determine the correct supply voltage at which to test memory 370, which is a supply voltage that causes a certain amount of memory cells to pass and a certain amount of memory cells to fail (see FIG. 7 and corresponding text for further details).

PUF generation module 320 then performs write/read tests 360 to determine which cells pass and which cells fail at the set supply voltage. PUF generation module 320 stores the test results in cell map 330. PUF generation module 320 then adjusts the supply voltage to memory 370 by sending a different supply voltage configuration value 340 to voltage regulator 350. PUF generation module 320 then performs another write/read tests 360 to determine which cells pass and which cells fail at the adjusted supply voltage. PUF generation module 320 repeatedly adjusts the supply voltage and performs write/read tests 360 until a sufficient amount of data is collected to separate passing cells, randomly failing cells, and failing cells. Passing cells are memory cells that consistently pass their memory test, which are those cells whose Vmin is below the tested supply voltages. Randomly failing cells are memory cells that pass their memory test at least once and fail their memory test at least once, which are those cells whose Vmin is close to the tested supply voltages. And, failing cells are memory cells that consistently fail their memory test, which are those cells whose Vmin is above the tested supply voltages (see FIG. 4 and corresponding text for further details). The discussions herein describe an embodiment where three rounds of write/read tests are performed. As those skilled in the art can appreciate, more or less tests may be performed to identify cells to use for PUF value generation.

PUF generation module 320 analyzes the cell map generated from the multiple tests and identifies those cells that consistently passed. It is this uniqueness on a per-device level that is the basis of using memory 370 to generate a unique identifier. PUF generation module 320 then uses the address locations of the passing cells to generate a unique identifier (e.g., hashing algorithm), which is then returned to thread controller 300 as PUF value 395 (see FIGS. 4, 5, and corresponding text for further details). In turn, the requesting thread uses PUF value 395 for authentication purposes.

In one embodiment, PUF generation module 320 identifies the cells that consistently failed and uses those addresses to generate a PUF value because the cell map of the consistently failing cells is also device-unique based on the manufacturing imperfections discussed herein. In turn, memory 370 may be used to generate two different PUF values (addresses of passing cells or addresses of failing cells).

In another embodiment discussed herein, PUF generation module 320 uses the randomly failing cells to generate a random number and send the random number (PUF/RN 395) to thread controller. In this embodiment, PUF generation module 320 uses the actual state values (bit values) of the randomly failing cells to generate the random number because, as discussed above, the randomly failing cells produce random state values because they are operating at or below their minimum operating voltage (see FIGS. 6, 9, and corresponding text for further details).

Figure 4:
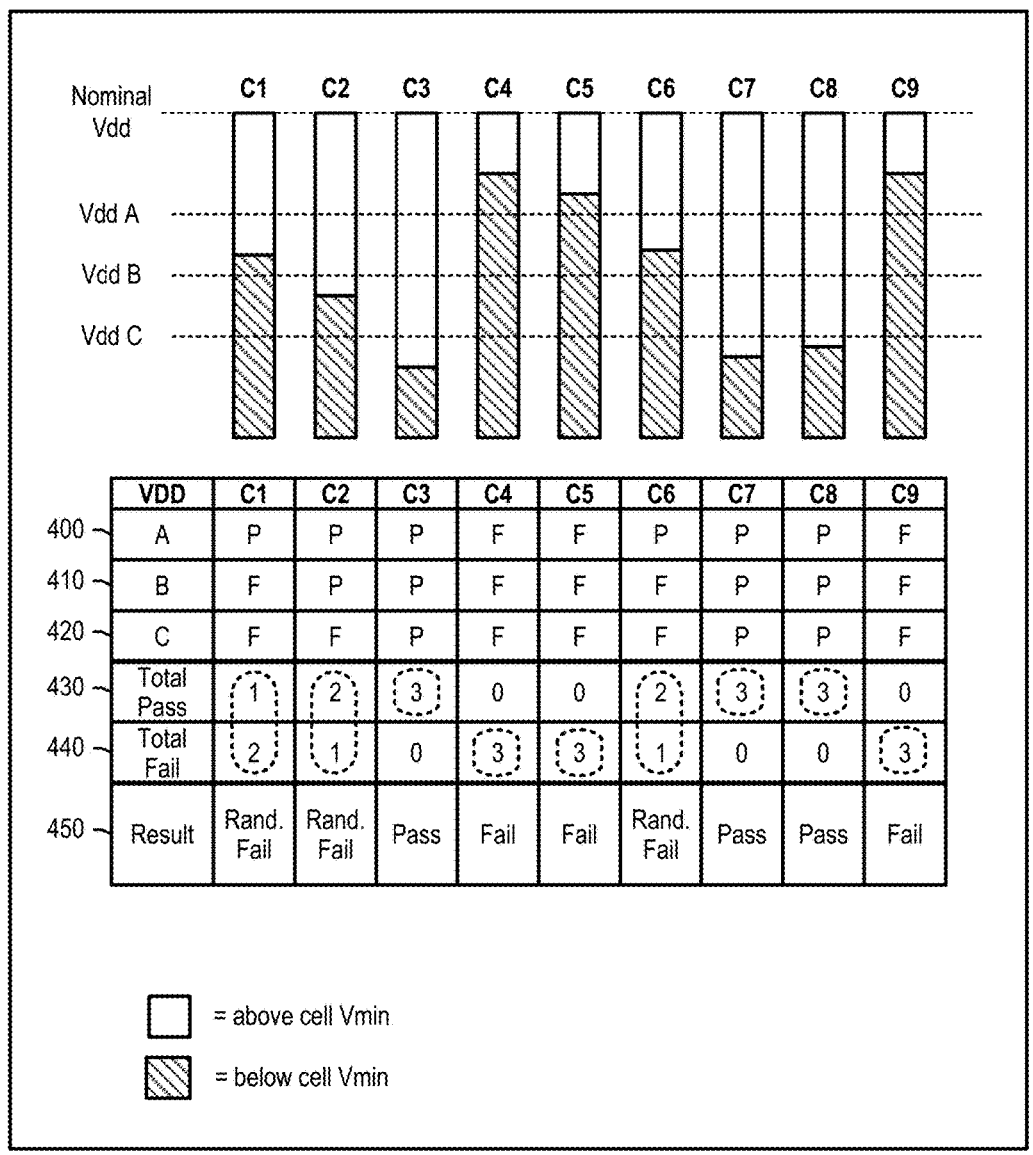
FIG. 4 is an exemplary diagram depicting memory cells tested at multiple voltages to identify their individual minimum operating voltage values.

FIG. 4 is an exemplary diagram depicting memory cells tested at multiple voltages to identify their individual minimum operating voltage values. FIG. 4 shows a graph of nine memory cells and their intrinsic minimum operating voltage (Vmin). As can be seen, each memory cell has a slightly different minimum operating voltage at which they can reliably operate due to manufacturing process imperfections. It is this unique cell 'footprint' that makes each memory cell unique, which PUF generation module 320 uses to generate a unique identifier.

In general, when a supply voltage is supplied that is at or above the cell's Vmin, then the cell passes the write/read test. However, if the supply voltage is below the cell's Vmin, the cell will fail one or more of the write/read tests because the cell is unstable at that point due to the supply voltage being lower than the cells required minimum voltage.

Figure 7:
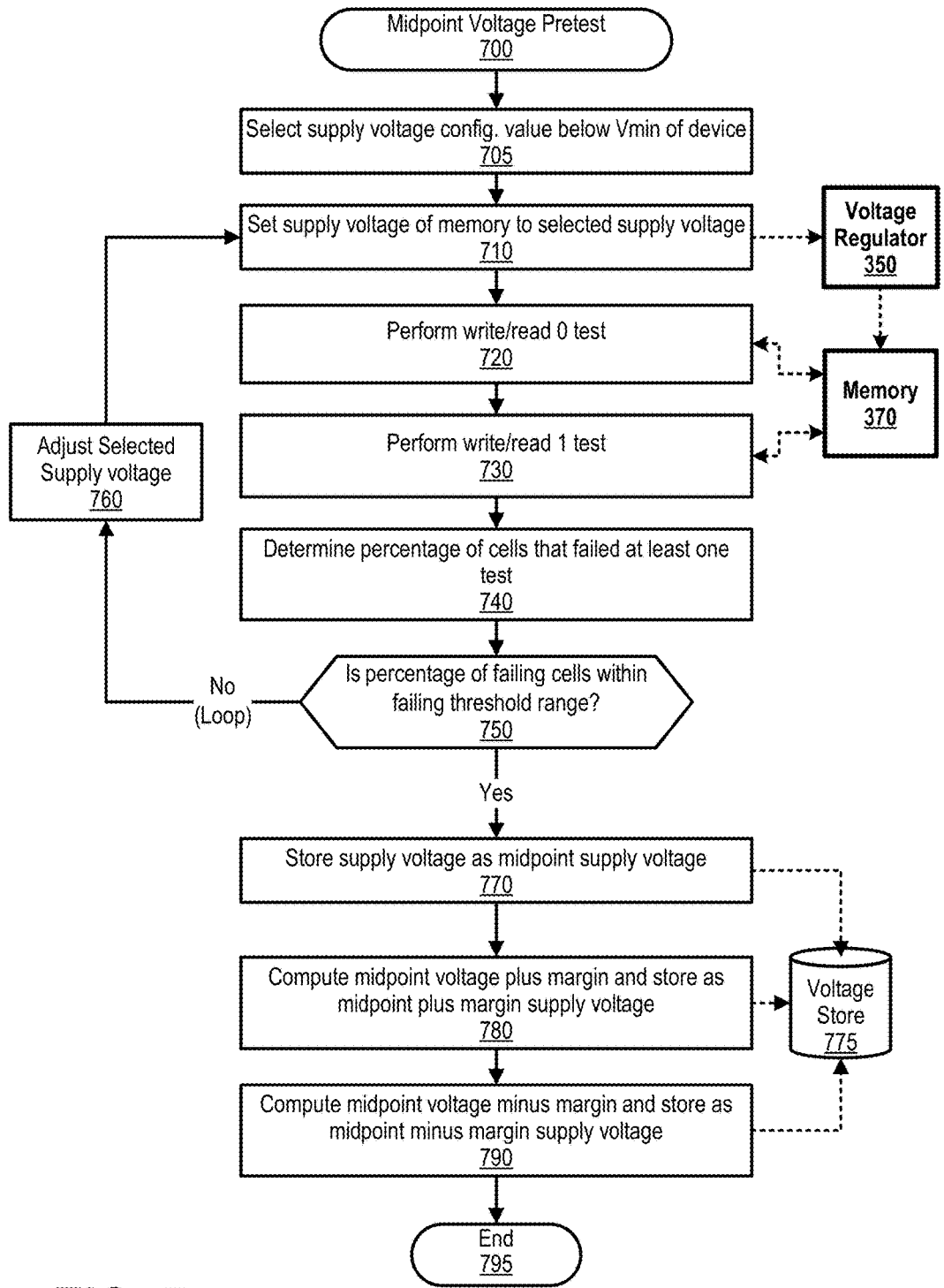
FIG. 7 is an exemplary flowchart showing steps taken to determine supply voltages at which to test a memory to generate a PUF value or random number.

Memory 370's nominal operating voltage, from a device standpoint, is at Vdd, which is above the specified overall device Vmin of memory 370. PUF generation module 320 adjusts the supply voltages below the nominal operating voltage and performs write/read tests as discussed herein. FIG. 4 shows that PUF generation module 320 adjusts the supply voltages to Vdd A, Vdd B, and Vdd C, which may be, for example, 2.3 volts, 2.2 volts, and 2.1 volts, respectively. As shown in FIG. 7, information handling system 100 make perform steps to pinpoint the supply voltages that balance the amount of passing cells and failing cells for each memory test.

Row 400 shows that, at Vdd A, cells C1, C2, C3, C6, C7, and C8 pass, while cells C4, C5, and C9 fail. Row 410 shows that, at Vdd B, cells C2, C3, C7, and C8 pass, while cells C1, C4, C5, C6, and C9 fail. And, row 420 shows that, at Vdd C, cells C3, C7, and C8 pass, while cells C1, C2, C4, C5, C6, and C9 fail. These results are then used to identify passing cells, randomly failing cells, and failing cells.

Row 430 shows the total amount of times that each cell passes, and row 445 shows the total amount of times that each cell fails. A cell is considered a consistent cell if the cell passes each of the tests (consistently passing cell) or fails each of the tests (consistently failing cell). The consistently passing cells or the consistently failing cells may then be used to generate the unique identifier (see FIG. 8 and corresponding text for further details).

Row 450 shows that cells C3, C7, and C8 may be used for creating a PUF value when passing cells are selected. Row 450 also shows that cells C4, C5, and C9 may be used for creating a PUF value when failing cells are selected. Cells that both pass and fail a test are considered randomly failing cells and are used for random number generation as discussed herein. Row 450 shows that cells C1, C2, and C6 may be used for random number generation (see FIGS. 6, 8, and corresponding text for further details).

Figure 5:
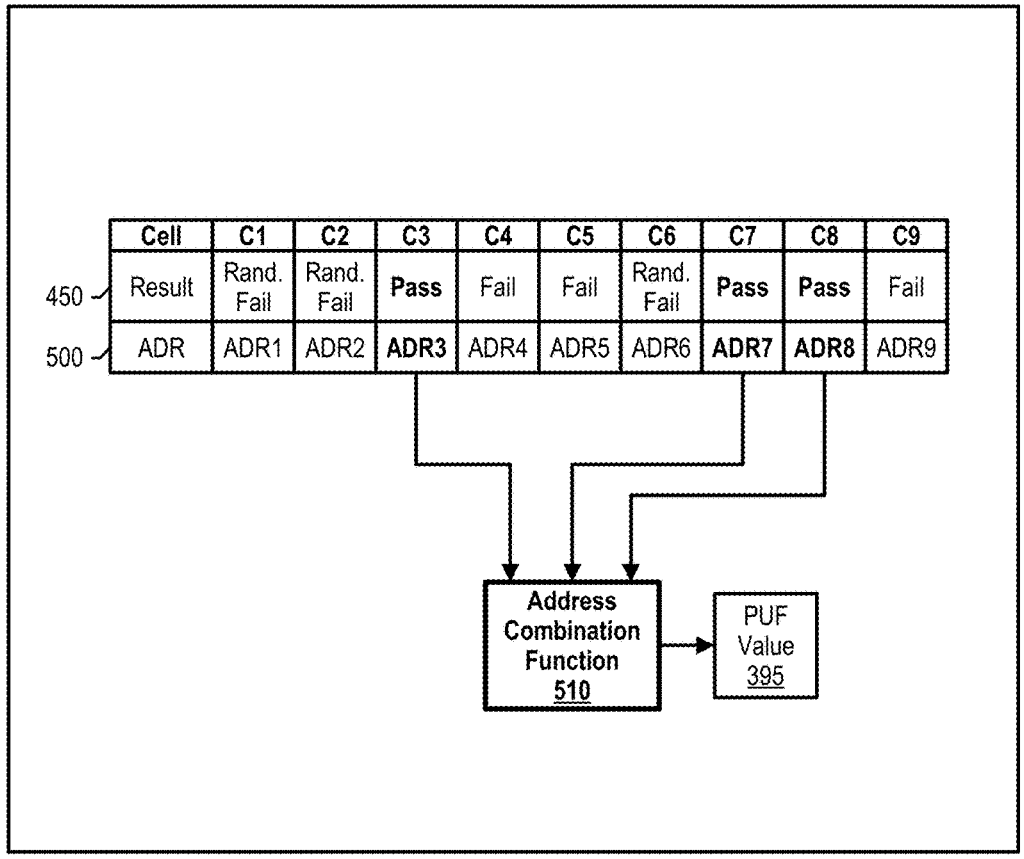
FIG. 5 is an exemplary diagram depicting a PUF generation module generating a PUF value using addresses of passing cells.

FIG. 5 is an exemplary diagram depicting PUF generation module 320 generating a PUF value using addresses of passing cells. Referring back to FIG. 4, row 450 shows that cells C3, C7, and C8 are passing cells, which are cells that passed each memory test at each supply voltage level. PUF generation module 320 identifies address locations of each of the passing cells (500) and uses address combination function 510 to generate PUF value 395. As discussed herein, address combination function 510 may be a hashing function, a compression function, a mapping function, or other data combination function.

Figure 6:
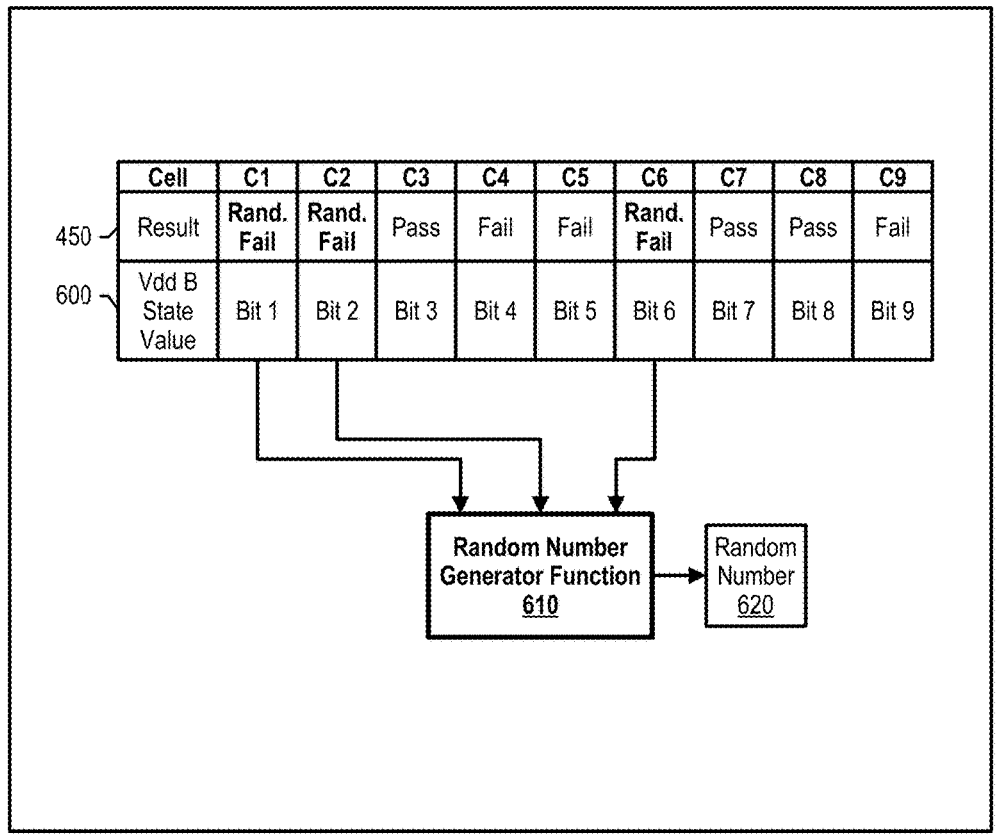
FIG. 6 is an exemplary diagram depicting a PUF generation module generating a random number using state values of randomly failing cells.

FIG. 6 is an exemplary diagram depicting PUF generation module 320 generating a random number using state values of randomly failing cells. Referring back to FIG. 4, row 450 shows that cells C1, C2, and C6 are randomly failing cells, which are cells that passed and failed at least one of the memory tests at one of the supply voltages. PUF generation module 320 captures the state values (bit values) from the cells and uses random number generator function 610 (e.g., hashing algorithm) to generate random number 620. In one embodiment, PUF generation module 320 uses the captured data values as the random number.

FIG. 7 is an exemplary flowchart showing steps taken to determine supply voltages at which to test a memory to generate a PUF value or random number. In one embodiment, information handling system 100 performs a series of pretests to determine how low to set the supply voltage of memory 370 such that the amount of memory cells fail a memory test (e.g., 50% of memory cells). In this embodiment, to conserve processing resources, information handling system 100 may perform the pretests one time and store the supply voltages for subsequent tests.

FIG. 7 processing commences at 700 whereupon, at step 705, the process selects a supply voltage configuration value below the specified Vmin of memory 370. For example, if the specified Vmin is 2.8 volts, processing may select 2.6 volts as a starting point. At step 710, the process sets the supply voltage level of memory 370 to the selected supply voltage via voltage regulator 350.

At step 720, the process performs a write/read 0 test on memory 370 and, at step 730, the process performs a write/read 1 test on memory 370. At step 740, the process determines the percentage of cells in memory 370 that failed at least one test. The process determines as to whether the percentage of failing cells is within a failing threshold range (e.g., 48-52% of memory cells failed) (decision 750). If the percentage of failing cells does not fall within the failing threshold range, then decision 750 branches to the 'no' branch which loops back to adjust the supply voltage accordingly (step 760) and retest the device at the adjusted supply voltage. For example, if the percentage of failing cells is below the failing threshold range (e.g., 30%), processing decreases the supply voltage to cause more memory cells to fail, and if the percentage of failing cells is above the failing threshold range (e.g., 60%), then processing increases the supply voltage to cause less memory cells to fail.

This looping continues until the percentage of failing cells falls within the failing threshold range, at which point decision 750 branches to the 'Yes' branch exiting the loop. At step 770, the process stores the final supply voltage as the midpoint supply voltage (Vdd B) in voltage store 775. At step 780, the process computes a midpoint plus margin value (e.g., +0.1V) and stores the value as a midpoint plus margin supply voltage (Vdd A) in voltage store 775. Then, at step 790, the process computes a midpoint minus margin value (e.g., −0.1V) and stores the value as a midpoint minus margin supply voltage (Vdd C) in voltage store 775. The stored voltages are then used in subsequent multi-voltage cell tests to identify all passing, random failing, and all failing memory cells as discussed herein (see FIGS. 8, 9, and corresponding text for further details). FIG. 7 processing thereafter ends at 795.

Figure 8:
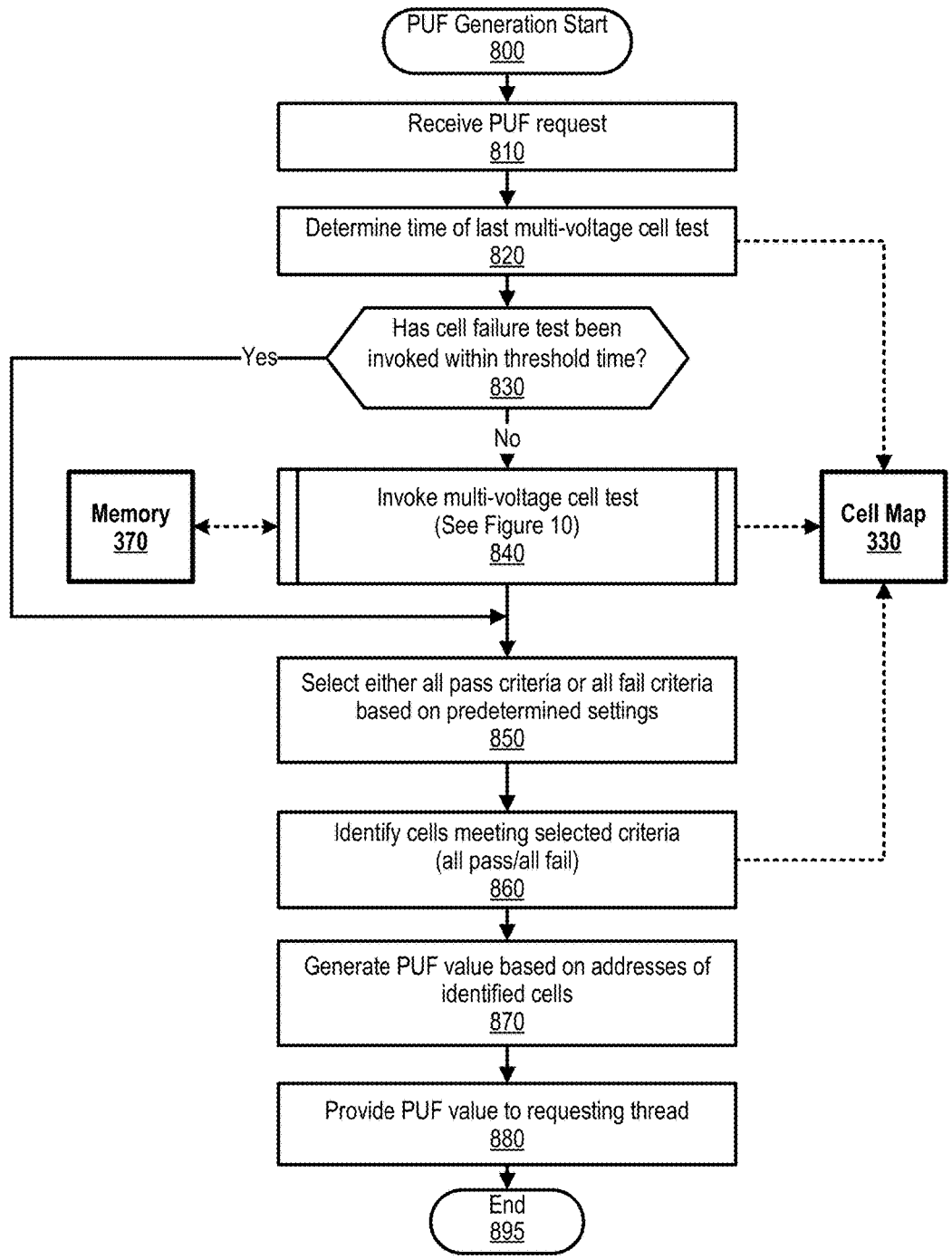
FIG. 8 is an exemplary flowchart showing steps taken to generate a PUF value based on real-time multi-voltage cell test results.

FIG. 8 is an exemplary flowchart showing steps taken to generate a PUF value based on real-time multi-voltage cell test results. FIG. 8 processing commences at 800 whereupon, at step 810, the process receives a PUF request, such as from a processor thread requiring a unique ID to sign onto a secure session. At step 820, the process determines a time of the last multi-voltage cell test. In one embodiment, the time of each multi-voltage cell test is logged in cell map 330 (see FIG. 9 and corresponding text for further details).

The process determines as to whether the multi-voltage cell test has been invoked within a predefined threshold time (decision 830). In one embodiment, the process may predefine a certain time that the PUF has to be regenerated due to security reasons and, in this embodiment, the threshold time may be dependent on the calling thread. For example, a highly secure thread may require the PUF to be generated on each request, while a less secure thread may require the PUF to be generated on each power cycle to reduce processing resource utilization.

If the multi-voltage cell test has been invoked within the threshold time, then decision 830 branches to the 'yes' branch bypassing another multi-voltage cell test. On the other hand, if the multi-voltage cell test has not been invoked within the threshold time, then decision 830 branches to the 'no' branch. At predefined process 840, the process performs a multi-voltage cell test on memory 370 and stores the results in cell map 330 (multi-voltage cell test results map) (see FIG. 10 and corresponding text for processing details).

At step 850, the process selects either all passing cells criteria or all failing cells criteria based on predetermined settings. In one embodiment, the process may select the all passing cells criteria or all failing cells criteria based on the calling thread. For example, assuming that there are significantly more all passing cells than all failing cells, a high security thread may require that the all passing cells are selected to generate a more complex PUF value. An important consideration in selecting all passing cells or all failing cells is that the selection remains the same for a particular calling thread. Meaning, when thread A requests a PUF value, the process is required to select all passing cells or all failing cells each time to ensure that the same PUF value is provided to thread A. In this embodiment, the thread may provide the all passing cells or all failing cells selection information.

At step 860, the process identifies the cells in cell map 330 that meet the selected criteria and, at step 870, the process generates a PUF value based on the addresses of identified cells. In one embodiment, the PUF value may be generated using the identified cells' addresses using approaches such as a hashing function, a compression function, mapping function, or other data combination functions. At step 880, the process provides the PUF value to the requesting thread and FIG. 8 processing thereafter ends at 895.

Figure 9:
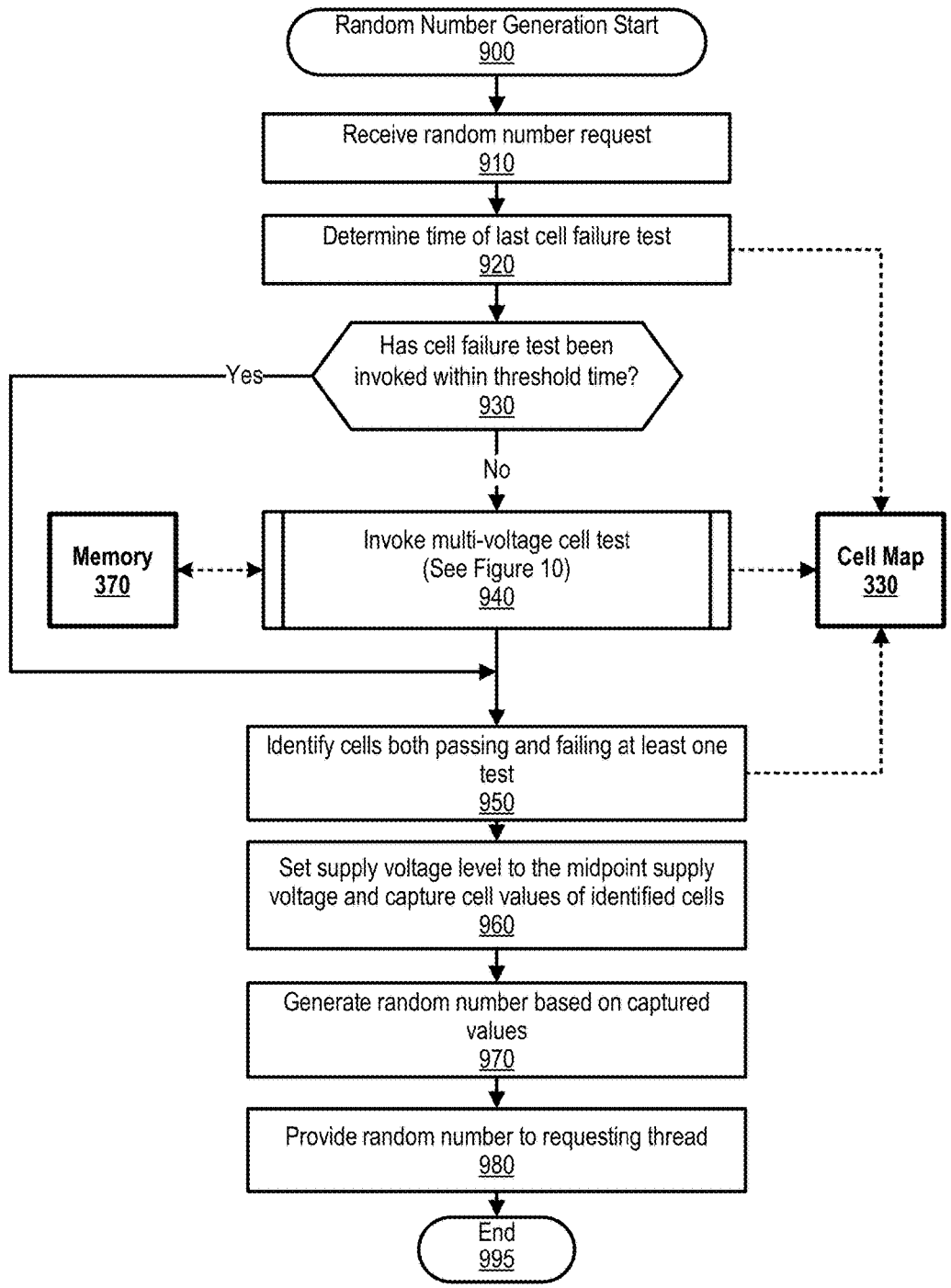
FIG. 9 is an exemplary flowchart showing steps taken to generate a random number based from inconsistent memory cells that are identified from real-time multi-voltage cell tests.

FIG. 9 is an exemplary flowchart showing steps taken to generate a random number based from inconsistent memory cells that are identified from real-time multi-voltage cell tests. FIG. 9 processing commences at 900 whereupon, at step 910, the process receives a random number generation request, such as from a processor thread requiring a random number to initialize a cryptography sequence, perform stochastic sequences, and etcetera.

At step 920, the process determines a time of the last multi-voltage cell test. In one embodiment, the time of each multi-voltage cell test is logged in cell map 330 (see FIG. 9 and corresponding text for further details). The process determines as to whether the multi-voltage cell test has been invoked within a predefined threshold time (decision 930). In one embodiment, the process may predefine a certain time that the random number has to be regenerated due to security reasons and the threshold time may be dependent on the calling thread.

If the multi-voltage cell test has been invoked within the threshold time, then decision 930 branches to the 'yes' branch bypassing another multi-voltage cell test. On the other hand, if the multi-voltage cell test has not been invoked within the threshold time, then decision 930 branches to the 'no' branch. At predefined process 940, the process performs a multi-voltage cell test on memory 370 and stores the results in cell map 330 (multi-voltage cell test results map) (see FIG. 10 and corresponding text for processing details).

At step 950, the process identifies inconsistent cells that pass and fail at least one of the voltage tests (see FIG. 4 and corresponding text for further details). In one embodiment, processing identifies a set of cells that produce a same set of results at step 950, such as all passing, all failing, or passing some and failing some. At step 960, the process sets memory 370's supply voltage to the midpoint supply voltage and captures the cell values of identified cells, such as the memory's initial start-up state. In one embodiment, to introduce more noise, the process sets the supply voltage to a level below the multi-voltage cell test levels and captures the initial startup bit values. For example, if the supply voltage levels during the multi-voltage cell test were 2.9V, 3.0V, and 3.1V, processing may set the supply voltage level to 2.6V at step 960 and capture the cell bit values.

At step 970, the process generates a random number based on the captured cell values (see FIG. 6 and corresponding text for further details). At step 980, the process provides the random number to the requesting thread and FIG. 9 processing thereafter ends at 995.

Figure 10:
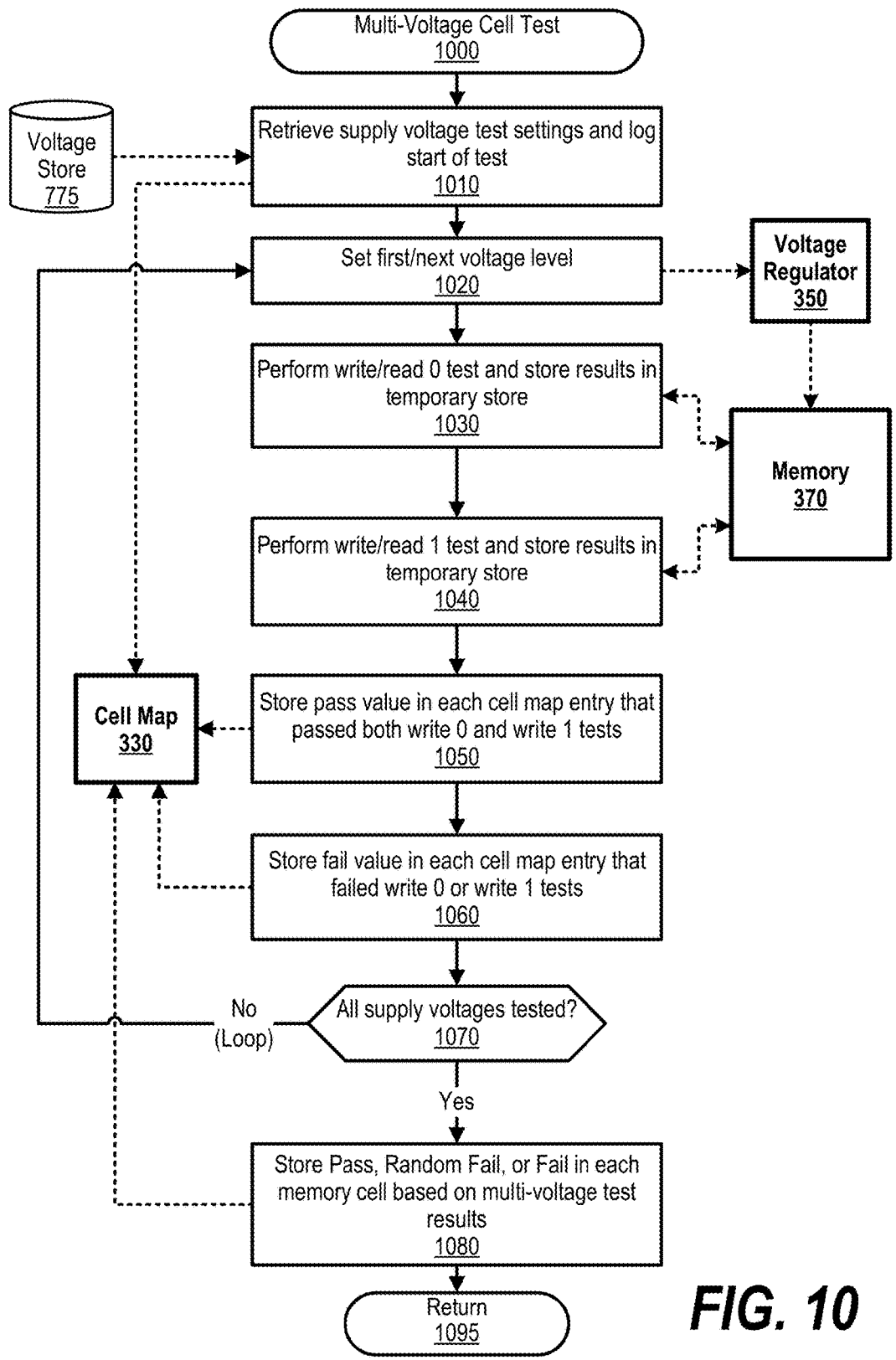
FIG. 10 is an exemplary flowchart showing steps taken to perform a real-time multi-voltage cell test.

FIG. 10 is an exemplary flowchart showing steps taken to perform a real-time multi-voltage cell test. FIG. 10 processing commences at 1000 whereupon, at step 1010, the process retrieves supply voltage test settings from voltage store 775 and logs the start of the test time in cell map 330. The supply voltage configuration values, in one embodiment, are based on a set of configuration tests to identify a midpoint supply voltage that produces a certain amount of passing cells, the technology the memory, previous test results from aggregate of other memory module, and etcetera (see FIG. 7 and corresponding text for further details).

At step 1020, the process sets the first supply voltage level of memory 370 via voltage regulator 350. For example, the process may provide a "101" supply voltage configuration value to voltage regulator 350 so voltage regulator 350 provides a supply voltage of 2.0 volts to memory 370. At step 1030, the process performs a write/read 0 test on memory 370 and stores results in a temporary storage area. The results indicate, for each memory cell, whether the memory cell passed the write/read test or whether the memory cell failed the write/ready test. At step 1040, the process performs a write/read 1 test and stores the results in the temporary storage area. As those skilled in the art can appreciate, other test patterns may be used besides all 1's or all 0's to test memory cells, such as "10101 . . . ," "0101 . . . ," and etcetera.

At step 1050, the process stores a pass value in each cell map entry that passed both write 0 and write 1 tests and, at step 1060, the process stores a fail value in each cell map entry that failed write 0 or write 1 tests. A cell is required to pass both write/read 0 and write/read 1 tests to be considered passing. Otherwise, the cell is considered failed at the particular supply voltage.

The process then determines as to whether memory 370 has been tested at each of the predetermined supply voltage levels (decision 1070). For example, FIG. 4 shows that the memory cells are tested at three different supply voltage levels (Vdd A, Vdd B, and Vdd C). If memory 370 has not been tested at each of the predetermined supply voltage levels, then decision 1070 branches to the 'no' branch which loops back to set memory 370's next supply voltage level and perform write/read tests. This looping continues until memory 370 has been tested at each of the predetermined supply voltage levels, at which point decision 1070 branches to the yes' branch exiting the loop.

At step 1080, processing stores a pass value (passes at each supply voltage), a random fail value (passes at some supply voltages and fails at some supply voltages), or a fail value (fails at each supply voltage) in each memory cell location of cell map 330 based on the results of the multi-voltage tests. FIG. 10 processing thereafter returns to the calling routine (see FIGS. 8 and 9) at 1095.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   performing a plurality of memory tests on a plurality of memory cells comprised in the memory, wherein one of a plurality of different supply voltage levels is supplied to the memory on each of the plurality of memory tests;
   identifying a first set of the plurality of memory cells that produce a same result during each of the plurality of memory tests at each of the different supply voltage levels;
   generating a unique identifier based on the identified first set of the plurality of memory cells; and
   utilizing the unique identifier in one or more processes executed by the processor.

2. The method of claim 1 wherein the unique identifier is based on a set of address locations of the identified first set of memory cells.

3. The method of claim 1 wherein the same result is a pass result at each of the plurality of memory tests at each of the plurality of different supply voltages.

4. The method of claim 3 further comprising:
   identifying a second set of the plurality of memory cells that fail each of the plurality of memory tests at each of the plurality of different supply voltages;
   generating a different unique identifier based on the identified second set of the plurality of memory cells; and
   utilizing the different unique identifier in the one or more processes executed by the information handling system.

5. The method of claim 1 wherein, prior to performing the plurality of memory tests, the method further comprises:
   supplying a pretest voltage value to power the memory and performing a first initial memory test on the plurality of memory cells;
   identifying an amount of the plurality of memory cells that failed the initial memory test;
   determining whether the amount of failing memory cells is within a failing threshold range;
   in response to determining that the amount of failing memory cells is within the failing threshold range, assigning the pretest voltage as a first one of the plurality of different supply voltage levels;
   in response to determining that the amount of failing memory cells is not within the failing threshold range, adjusting the pretest voltage; and
   supplying the adjusted pretest voltage to power the memory and performing a second initial memory test on the plurality of memory cells.

6. The method of claim 5 wherein, in response to assigning the pretest voltage as one of the plurality of different supply voltage levels, the method further comprises:
   determining a second one of the plurality of different supply voltage levels by adding a voltage margin to the pretest voltage; and
   determining a third one of the plurality of different supply voltage levels by subtracting the voltage margin from the pretest voltage.

7. The method of claim 1 wherein each of the plurality of memory cell tests comprises both a write/read 1 test and a write/read 0 test.

8. The method of claim 1 further comprising:
   providing, by a voltage regulator, the plurality of different supply voltage levels solely to the memory based on a corresponding plurality of different supply voltage configuration values.

9. An information handling system comprising:
   one or more processors;
   a memory coupled to at least one of the processors;
   a set of computer program instructions stored in the memory and executed by at least one of the processors in order to perform actions of:
      performing a plurality of memory tests on a plurality of memory cells comprised in the memory, wherein one of a plurality of different supply voltage levels is supplied to the memory on each of the plurality of memory tests;
      identifying a first set of the plurality of memory cells that produce a same result during each of the plurality of memory tests at each of the different supply voltage levels;
      generating a unique identifier based on the identified first set of the plurality of memory cells; and
      utilizing the unique identifier in one or more processes executed by the processor.

10. The information handling system of claim 9 wherein the unique identifier is based on a set of address locations of the identified first set of memory cells.

11. The information handling system of claim 9 wherein the same result is a pass result at each of the plurality of memory tests at each of the plurality of different supply voltages.

12. The information handling system of claim 11 wherein the one or more processors perform additional actions comprising:
   identifying a second set of the plurality of memory cells that fail each of the plurality of memory tests at each of the plurality of different supply voltage levels;
   generating a different unique identifier based on the identified second set of the plurality of memory cells; and
   utilizing the different unique identifier in the one or more processes executed by the information handling system.

13. The information handling system of claim 9 wherein, prior to performing the plurality of memory tests, the one or more processors perform additional actions comprising:
   supplying a pretest voltage to power the memory and performing a first initial memory test on the plurality of memory cells;
   identifying an amount of the plurality of memory cells that failed the initial memory test;
   determining whether the amount of failing memory cells is within a failing threshold range;
   in response to determining that the amount of failing memory cells is within the failing threshold range, assigning the pretest voltage as a first one of the plurality of different supply voltage levels;
   in response to determining that the amount of failing memory cells is not within the failing threshold range, adjusting the pretest voltage; and
   supplying the adjusted pretest voltage to power the memory and performing a second initial memory test on the plurality of memory cells.

14. The information handling system of claim 13 wherein, in response to assigning the pretest voltage as one of the plurality of different supply voltage levels, the one or more processors perform additional actions comprising:

determining a second one of the plurality of different supply voltage levels by adding a voltage margin to the pretest voltage; and determining a third one of the plurality of different supply voltage levels by subtracting the voltage margin from the pretest voltage.

15. The information handling system of claim 9 wherein each of the plurality of memory cell tests comprises both a write/read 1 test and a write/read 0 test.

16. The information handling system of claim 9 further comprising a voltage regulator that supplies the plurality of different supply voltage levels solely to the memory.

17. An information handling system comprising:
one or more processors;
a memory coupled to at least one of the processors;
a voltage regulator that receives a plurality of different supply voltage configuration values from at least one of the processors and supplies a plurality of different supply voltage levels solely to the memory based on the plurality of different supply voltage configuration values; and
a set of computer program instructions stored in the memory and executed by at least one of the one or more processors in order to perform actions of:
performing a plurality of memory tests on a plurality of memory cells comprised in the memory at each of the plurality of different supply voltage levels;
identifying a first set of the plurality of memory cells that produce a same result during each of the plurality of memory tests at each of the different supply voltage levels;
generating a unique identifier based on a set of address locations of the identified set of the plurality of memory cells; and
utilizing the unique identifier in one or more processes executed by the at least one processor.

18. The information handling system of claim 17 wherein, prior to performing the plurality of memory tests, the one or more processors perform additional actions comprising:
supplying a pretest voltage to power the memory and performing a first initial memory test on the plurality of memory cells;
identifying an amount of the plurality of memory cells that failed the initial memory test;
determining whether the amount of failing memory cells is within a failing threshold range;
in response to determining that the amount of failing memory cells is within the failing threshold range, assigning the pretest voltage as a first one of the plurality of different supply voltage levels;
in response to determining that the amount of failing memory cells is not within the failing threshold range, adjusting the pretest voltage; and
supplying the adjusted pretest voltage to power the memory and performing a second initial memory test on the plurality of memory cells.

19. The information handling system of claim 17 wherein the same result is a pass result at each of the plurality of memory tests at each of the different supply voltages.

* * * * *